United States Patent [19]

Choudhury et al.

[11] Patent Number: 5,521,916
[45] Date of Patent: May 28, 1996

[54] IMPLEMENTATION OF SELECTIVE PUSHOUT FOR SPACE PRIORITIES IN A SHARED MEMORY ASYNCHRONOUS TRANSFER MODE SWITCH

[75] Inventors: Abhijit K. Choudhury, Scotch Plains; Ellen L. Hahne, Westfield, both of N.J.

[73] Assignee: AT&T Corp., Murray Hill, N.J.

[21] Appl. No.: 348,530

[22] Filed: Dec. 2, 1994

[51] Int. Cl.$^6$ .................................................. H04L 12/56
[52] U.S. Cl. .......................................... 370/60.1; 370/94.2
[58] Field of Search ................................. 370/85.6, 94.1, 370/94.2, 60, 60.1, 79

[56] References Cited

U.S. PATENT DOCUMENTS

| | | | |
|---|---|---|---|
| 5,014,265 | 5/1991 | Hahne et al. | 370/60 |
| 5,016,248 | 5/1991 | Kudoh | 370/94.1 |
| 5,062,106 | 10/1991 | Yamazaki et al. | 370/85.6 |
| 5,072,443 | 12/1991 | Hahne et al. | 370/85.9 |
| 5,115,430 | 5/1992 | Hahne et al. | 370/85.6 |
| 5,136,584 | 8/1992 | Hedlund | 370/94.1 |
| 5,163,046 | 11/1992 | Hahne et al. | 370/79 |
| 5,193,090 | 3/1993 | Filipiak et al. | 370/94.1 |
| 5,233,606 | 8/1993 | Pashan et al. | 370/85.6 |
| 5,272,697 | 12/1993 | Fraser et al. | 370/61 |
| 5,278,969 | 1/1994 | Pashan et al. | 395/425 |
| 5,280,470 | 1/1994 | Buhrke et al. | 370/13 |
| 5,285,441 | 2/1994 | Bansal et al. | 370/16 |
| 5,289,303 | 2/1994 | Cloonan et al. | 359/139 |

OTHER PUBLICATIONS

M. I. Irland, "Buffer Management in a Packet Switch", IEEE Trans. on Communications, vol. COM-26, No. 3, Mar. 1978, pp. 328–337.
E. L. Hahne et al., "DQB Networks With and Without Bandwidth Balancing", IEEE Trans. on Communications, vol. 40, No. 7, Jul. 1992, pp. 1192–1204.
A. K. Choudhury et al., "Space Priority Management in a Shared Memory ATM Switch", Proc. Globecom '93, Houston, Texas, Dec. 1993, pp. 1–9.
K. Y. Eng et al., "A High-Performance Prototype 2.5 Gb/s ATM Switch for Broadband Applications", Proc. IEEE GLOBECOM '92, vol. 1, pp. 111–117, Orlando, Florida, Dec. 1992.
H. Jonathan Chaco and I. Hakan Pekcan, "Queue Management with Multiple Delay and Loss Priorities for ATM Switches", New Orleans SuperCom/ICC '94, May 1994, pp. 1184–1189.
D. Tipper et al., "Adaptive Policies for Optimal Buffer Management in Dynamic Load Environments", Proc. IEEE INFOCOM '88, pp. 535–544.
A. K. Thareja et al., "Buffer Sharing in Dynamic Load Environment", Proc. IEEE INFOCOM '84, pp. 369–379.

*Primary Examiner*—Douglas W. Olms
*Assistant Examiner*—Min Jung

[57] ABSTRACT

A system for queueing and selective pushout and method are disclosed for a packet communications module such as a shared memory asynchronous transfer mode (ATM) switch. The shared memory stores packets in queues, each packet having a field and at most two pointers. Within each queue, the packets having respective space priorities are stored in subqueues each having the respective space priorities. The packets are stored in these priority subqueues using a first pointer pointing to the next packet of the same space priority in the queue. The second pointer associated with a stored packet points to the previous packet of greater than or equal space priority in the FIFO order in the queue. The field of a packet is used to store the priority value corresponding to the next packet in FIFO order in the queue, and this field is used by a processor to decide priority sub-queues to serve next. The packets are stored in the queues in a FIFO order using the two pointers and the fields of the packets. The processor controls the selective pushout to push out a packet and uses the two pointers and the fields of the packets to restore the FIFO order. A method is also disclosed including the steps of storing packets in a queue, with each of the queued packets associated with the two pointers and a field; serving the queue; pushing out packets from the queue; and maintaining queue-lengths and a state information table.

20 Claims, 7 Drawing Sheets

BEFORE PUSHOUT

AFTER PUSHOUT

FIG. 9

| QUEUE ID | PACKETS OF PRIORITY 1 | PACKETS OF PRIORITY 2 | ... | PACKETS OF PRIORITY P |
|---|---|---|---|---|
| ID OF LONGEST QUEUE | Y/N | Y/N | | Y/N |
| ID OF 2ND LONGEST QUEUE | Y/N | Y/N | | Y/N |
| ... | | | | |
| ID OF SHORTEST QUEUE | Y/N | Y/N | | Y/N |
| ALL QUEUES | Y/N | Y/N | | Y/N |

IMPLEMENTATION OF SELECTIVE PUSHOUT FOR SPACE PRIORITIES IN A SHARED MEMORY ASYNCHRONOUS TRANSFER MODE SWITCH

BACKGROUND OF THE INVENTION

1. Field of the Invention

This disclosure relates to packet-switched communications systems. More particularly, this disclosure is directed to a system for queueing and selective pushout and method for use in packet communication processing modules.

2. Description of the Related Art

In the field of switched broadband integrated services digital networks (BISDN), packet processing such as asynchronous transfer mode (ATM) cell switching may be implemented using a shared-buffer-memory-based architecture, where incoming packets such as ATM cells destined for different output ports are buffered in queues sharing a common memory with the queues corresponding to those ports. Such packet processing is employed to support a wide spectrum of information services with very different bandwidth and quality of service (QoS) requirements.

A flexible way to provide different QoS is to use a priority mechanism inside a packet communications module. Priorities may be of two different types: delay (or time) priorities and loss (or space) priorities. Delay priorities provide preferential service to some classes of traffic in order to control their end-to-end delay and delay variation (jitter). Loss (or space) priorities provide preferential access to buffer space.

Pushout systems and methods allow the entire buffer space to be shared flexibly among the different queues as well as among the various space priority classes. As long as the buffer is not completely full, arriving packets of any priority are admitted. When the buffer is full, pushout systems provide space for the arriving packet by pushing out (i.e. overwriting) another packet that is already in buffer. In selective pushout, a packet that arrives to find the buffer full is allowed to enter by pushing out a packet of lower priority. For a packet communications module using first-in-first-out (FIFO) queues, while the physical memory location of the lower priority packet is usurped, the higher priority packet does not take over its position in its logical FIFO queue, i.e., the pushing and the pushed packets may be destined to different outputs and hence belong to different logical FIFO's. The higher priority packet that has arrived joins the tail of the logical FIFO queue for its own output.

Generally, the arriving packet has a choice of lower priority victims. In that case, the arriving packet should consider only those output queues containing packets of the lowest priority, and among these, the longest output queue should be selected. This bias against long queues allows shorter queues to lengthen, thereby creating a degree of fairness in the sharing of buffer space among output queues; it also tends to keep more memory outputs busy, which increases the efficiency of the system. Thus, pushout may be used to equalize queue lengths as well as to enforce space priorities (also referred to herein as loss priorities). If this longest queue has more than one lowest priority packet, the lowest priority packet nearest the head of the queue is selected for pushout. If a packet arrives to a full buffer when there are no lowest priority packets in the shared memory, then a packet of the second-lowest priority is pushed out. If there are no such packets, then the third-lowest priority is considered, and so on. If there are no packets in the buffer of priority lower than the arriving packet, then the arriving packet may push out a packet of the same priority as itself, from the longest queue containing such packets. While this does not immediately improve the packet loss rate for that priority class, it does contribute to queue length equalization. If all the packets in the buffer have higher priority than the arriving packet, then the arriving packet is dropped.

In a first implementation of selective pushout, the packets in the queue are in a FIFO linked-list arrangement, with the order of the FIFO queue provided by packet pointers, i.e., pointers for pointing from one packet to another. In addition to the QUEUE_LENGTH (QL) counter and the FIRST_PACKET (FP) and LAST_PACKET (LP) pointers, the output queue also maintains FIRST_PACKET_OF_CLASS_i (FP[i]) pointers to the first packet of each priority class i. Whenever a pushout is needed, one of these pointers will indicate the packet to be pushed out. Then the queue must be scanned to update that pointer. In order to mend the FIFO linked-list after a pushout, the output queue also maintains another set of pointers PACKET_BEFORE_FIRST_PACKET_OF_CLASS_i (PBFP[i]) to the packet immediately preceding the first packet of each priority class i. This implementation of selective pushout is relatively simple and requires minimal state information, but in a worst case situation, the entire shared memory may need to be scanned in order to update the FP[i] pointer. For this reason, this first implementation is impractical for large buffer sizes.

In a second implementation of selective pushout shown in FIGS. 1A–1B, each output port maintains its FIFO queue as a doubly-linked-list, so that the FIFO order may be re-established whenever a packet is pushed out from the middle of the queue. In addition, each space priority class has its own singly-linked chain through the FIFO queue. These priority chains allow the ATM switch to quickly find the appropriate packet for a pushout.

As shown in FIG. 1A, every packet needs two pointers related to the FIFO order. In an exemplary embodiment for switching fixed length ATM packets (or cells), the two pointers are: a NEXT_PACKET (NP) pointer and a PREVIOUS_PACKET_IN_FIFO_ORDER (PP) pointer. Each packet also needs one pointer related to its priority chain, which, in the above example, is the NEXT_PACKET_OF_SAME_CLASS (NS) pointer. In addition to the QUEUE_LENGTH (QL) counter and the FIRST_PACKET (FP) and LAST_PACKET (LP) pointers, each output queue also needs two other pointers for each space priority class i=1, 2, ..., P, in order to maintain the priority chains: a FIRST_PACKET_OF_CLASS_i (FP[i]) and a LAST_PACKET_OF_CLASS_i (LP[i]) pointer. As shown in FIG. 1B, when the packet occupying location X2 is pushed out by a newly arrived packet, the new packet joins the tail of the queue. The various pointers are then updated to re-establish the FIFO order after the pushout as shown in FIG. 1B. The second implementation of selective pushout thus uses more state information than the first implementation to provide for generally faster processing speeds, but the additional state information requires more space in the shared memory.

SUMMARY

A system is disclosed for queueing and selective pushout of packets such as asynchronous transfer mode (ATM) cells in a packet communications module. In an exemplary embodiment, the packet communications module is an ATM switch, including a processor with stored programs, a shared memory, and a plurality of input and output ports. The ATM switch receives a plurality of packets on its input ports, stores them temporarily in the shared memory, and transmits each packet on an appropriate output port. The memory is configured for storing the packets in a plurality of queues, each queue being associated with packets received at a corresponding one of the output ports. All the output port queues share a common memory space. The processor is configured for admitting received packets to the shared memory by creating space if needed using selective pushout on packets that are already queued therein.

Each packet is queued using a first and second pointer and a field. Within each output port queue, the packets having respective space priorities are stored in a plurality of sub-queues each associated with the respective space priorities. The packets are stored in these priority subqueues using the first pointer which points to the next packet of the same space priority in the output queue. The second pointer associated with a stored packet points to the previous packet of space priority greater than or equal to itself in the FIFO order in the output queue. The field associated with a packet is used to store the priority value corresponding to the next packet in FIFO order in the output queue, and this field is used by the processor to decide which priority sub-queue to serve next. The packets are stored in the output queue in a FIFO order using the first and second pointers and the fields associated with the packets. The processor controls the selective pushout to push out a first packet and uses the first and second pointers and the fields of the remaining packets to re-establish the FIFO order.

A method is also disclosed for queueing and selective pushout of packets in the shared memory of the packet communications module. The method includes the steps of storing packets in the at least one queue, and within the at least one queue, storing the packets in a plurality of priority sub-queues corresponding to the space priorities of the packets, where the at least one queue and the sub-queues have some data structures associated with them and the packets are associated with a first pointer and second pointers and a field; serving the output queue; pushing out packets from the output queue; and maintaining queue-lengths and a state information table. The data structures associated with the at least one queue are a queue-length counter and a field indicating which priority is first in the FIFO order; and the data structures associated with each priority sub-queue are a first and a second pointer pointing to the first and last packets respectively in the sub-queue, and a field indicating the priority of the previous cell in the FIFO order whose priority is greater than or equal to that of the sub-queue under consideration.

The step of storing a packet in the at least one output queue includes the steps of receiving an incoming packet having an associated space priority; using selective pushout to create space if needed; storing the packet in the priority sub-queue corresponding to the space priority of the packet using the first pointer; storing in the field associated with each packet the priority value corresponding to the next packet in FIFO order; maintaining a FIFO order among the packets queued in the output queue using the field and the second pointer that points to the previous packet of greater or equal priority in the FIFO order; and incrementing the queue-length counter and updating the other data structures associated with the at least one queue and the priority sub-queues contained therein.

The step of serving the at least one output queue includes the step of transmitting the first packet in the FIFO order in the at least one output queue; updating the second pointers; and decrementing the queue-length counter and updating the other data structures associated with the at least one queue and the priority sub-queues contained therein.

The step of pushing out the first packet includes the steps of determining a longest queue of the at least one output queue containing a packet of the lowest priority lower than or equal to that of the incoming packet; pushing out the first packet from the lowest priority sub-queue within the longest queue; decrementing the queue-length counter and updating the other data structures associated with the at least one queue and the priority sub-queues contained therein; and restoring the FIFO order of the at least one output queue using the first and second pointers and the fields of the queued packets.

The method includes the step of maintaining the queue-length of the at least one output queue and a state information table including identifying information for the at least one output queue and information about the priority of packets contained therein; and the step of determining from the state information table a longest queue containing a packet of the lowest priority lower than or equal to that of the incoming packet.

BRIEF DESCRIPTION OF THE DRAWINGS

The features of the disclosed implementation of the selective pushout system and method will become more readily apparent and may be better understood by referring to the following detailed description of an illustrative embodiment of the present invention, taken in conjunction with the accompanying drawings, where:

FIG. 9 illustrates a state information table.

DESCRIPTION OF THE PREFERRED EMBODIMENTS

Figure 1B:
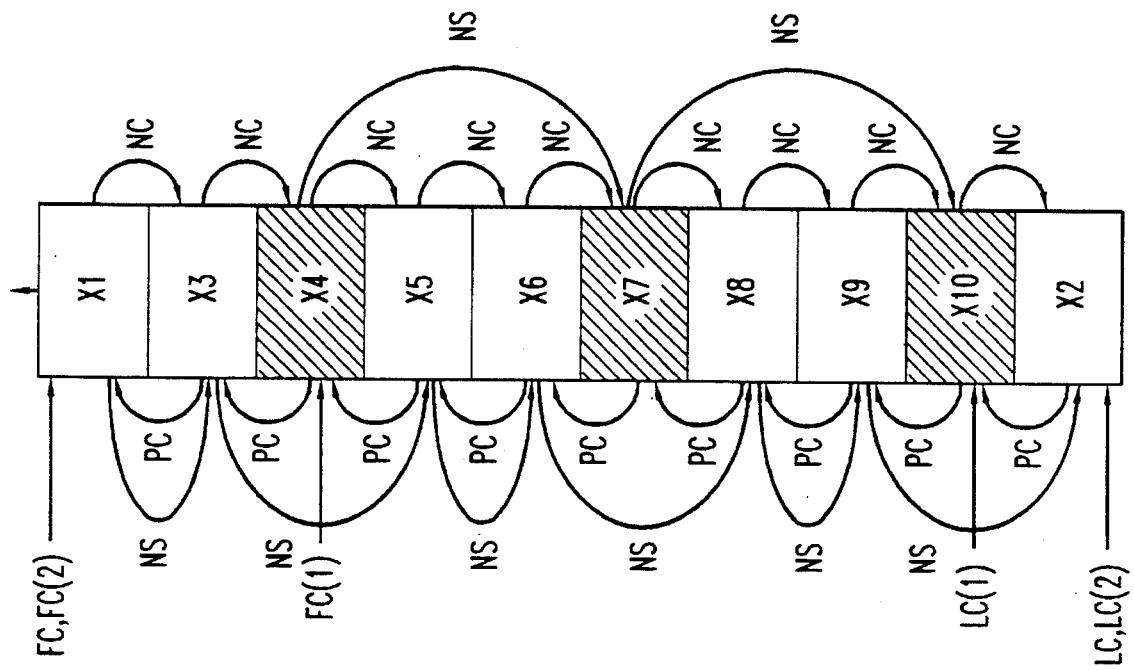
FIGS. 1A–1B illustrate an example of an implementation of selective pushout using three packet pointers.
Figure 1A:
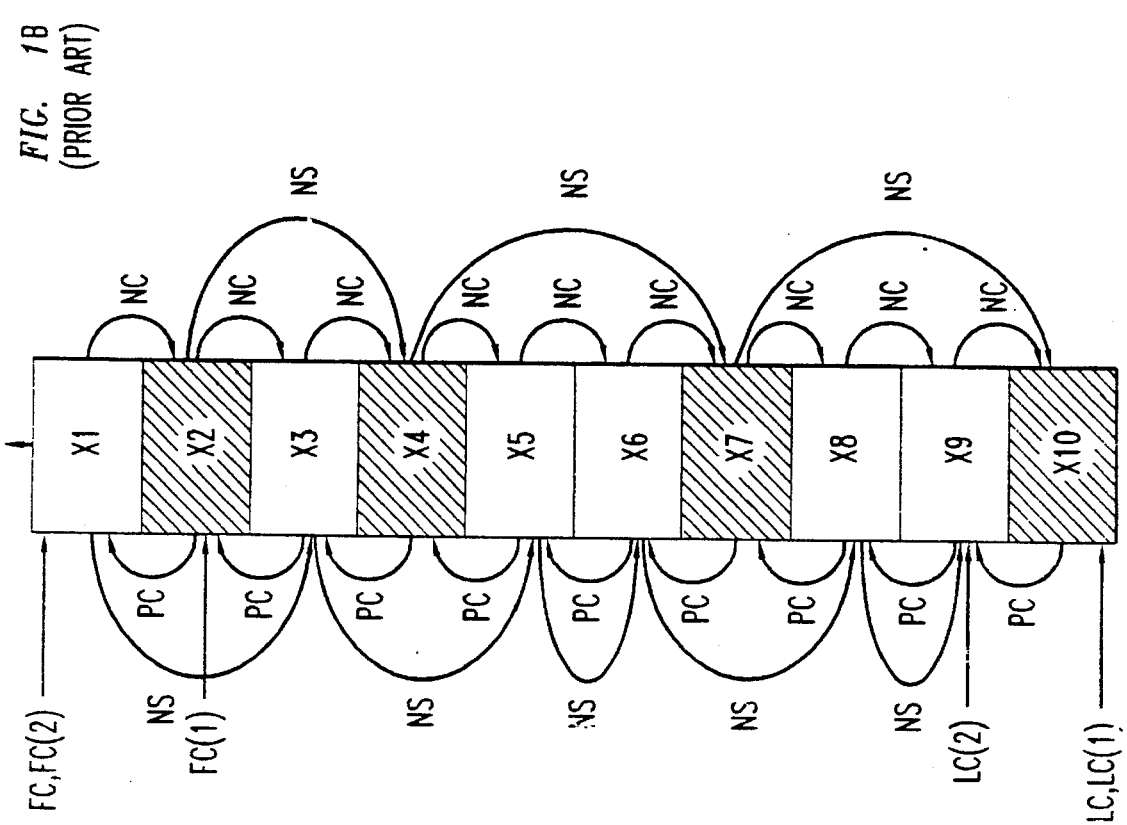
Figure 2:
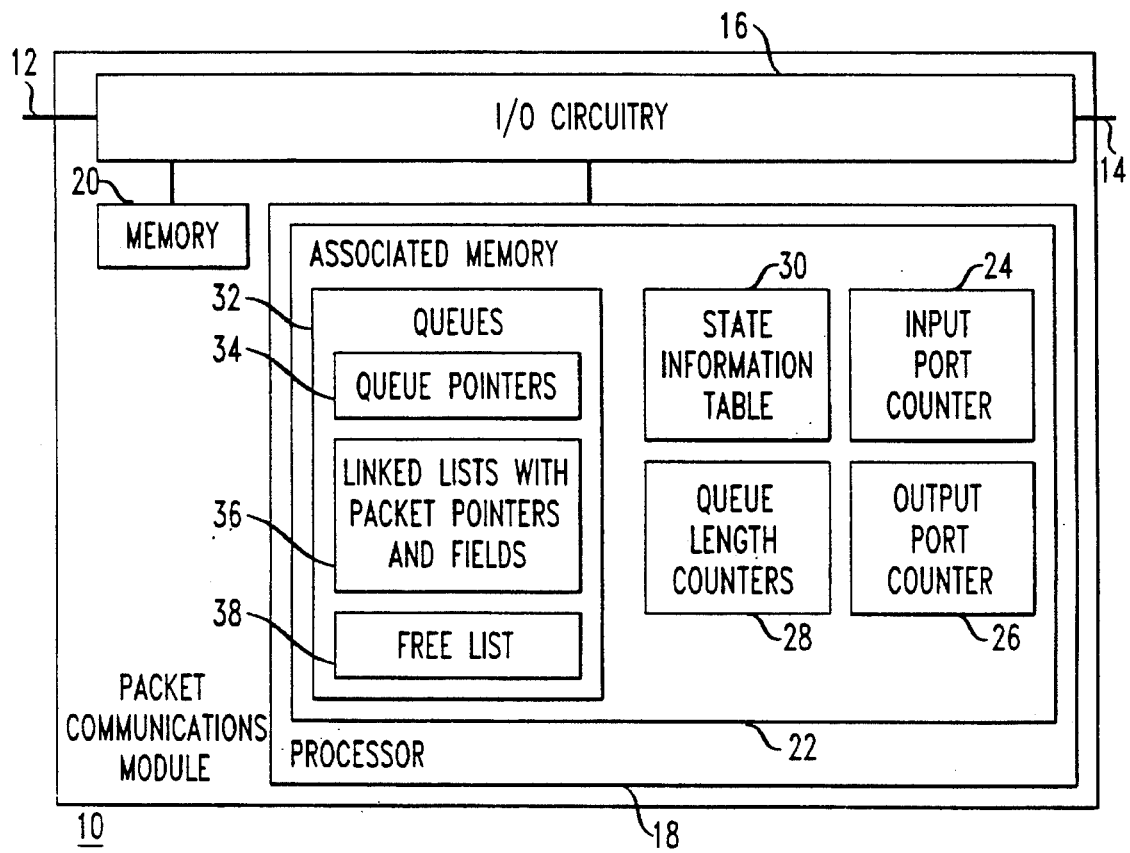
FIG. 2 illustrates a block diagram of the components of the packet communications module using the implementation of selective pushout system and method using two packet pointers and the field disclosed herein.

Referring now in specific detail to the drawings, with like reference numerals identifying similar or identical elements, as shown in FIG. 2, the present disclosure describes a shared-buffer-memory-based packet communications module 10; for example, an ATM switch module. The shared-buffer-memory-based packet communications module 10 disclosed herein processes packets, which are herein defined as units of data that are addressed with routing information. In the context of packet processing systems, the packets are allowed to be of any length, or may be of a length not greater than a predetermined maximum.

In the exemplary embodiment described herein, the disclosed implementation of the system for queueing and selective pushout and method are illustrated for a packet switch with multiple input ports and multiple output ports, such as an asynchronous transfer mode (ATM) switch, using fixed length packets. For example, the packets may be fixed to be exactly 53 bytes long, where such 53 byte long packets are termed "cells". Alternatively, the packets in a higher protocol layer may have a longer length and are termed "messages" which may be subdivided to generate a plurality of cells for ATM switching.

It is understood that other packet lengths, including packets of variable length, may be processed by the disclosed implementation of the selective pushout system and method.

The present disclosure describes an exemplary embodiment of a shared memory ATM switch implementing the system for queueing and selective pushout and method. In alternative embodiments, the disclosed system for queueing and selective pushout and method may also be used in conjunction with multiple-input, single-output packet systems (i.e., multiplexers) and single-input, multiple-output packet systems (i.e., demultiplexers). For multiplexers, the selective pushout would be used to allocate memory among packets of different space priorities received from competing input ports.

In the exemplary embodiment, the disclosed packet communications module 10, as a shared memory ATM switch, is connected to one or more input ports 12 over which the communications module 10 receives incoming packets, with individual packets having a priority level. The packet communications module 10 is also connected to one or more output ports 14 for transmitting the switched packets. Input ports are connected to input and output (I/O) circuitry 16 which couples input ports to a processor 18 and a memory 20.

ATM switches are well known in the art. In the exemplary embodiment of the packet communications module 10 as an ATM switch, the I/O circuitry 16 may include such mechanisms as phase-alignment circuitry, serial-to-parallel and parallel-to-serial shift registers. Copies of header portions of incoming packets received from input ports are sent by I/O circuitry 16 to processor 18, and the packets are sent by I/O circuitry 16 to memory 20 for storage. The shared memory 20 shown in FIG. 2 may be embodied as one or more RAMs.

In an exemplary embodiment, the associated memory 22 in FIG. 2 preferably implements logical queues in the form of linked lists, but in alternative embodiments, the queues may be implemented as physical queues or some other data structures in the memory 20 and/or the associated memory 22.

Referring again to FIG. 2, processor 18 controls storage of incoming packets in memory 20 and transmission of stored packets at the output ports. In the exemplary embodiment disclosed herein, the processor 18 includes associated memory 22 and control logic to maintain an input port counter 24, an output port counter 26, queue-length counters 28, a state information table 30, and queues 32 including queue pointers 34, linked lists 36 with packet pointers and fields, and a list 38 of free or available locations in memory 20, such that for every individual one of the output ports a separate sub-queue in memory buffers for each one of the packet priorities.

The associated memory 22 stores the pointers to the packets in queues 32 which comprise the queue pointers 34 which point to packets in the queue, such as a first packet, as well as the linked-lists 36 using the packet pointers (i.e., which are defined in the present disclosure as pointer for pointing from one packet to another) and fields which indicate a priority value as disclosed herein. In the system for queueing and selective pushout and method disclosed herein, there are two packet pointers NS and PG, as disclosed herein. Also in queues 32 is a free list 38 comprising free list pointers which point to free locations in memory available for insertion of received packets. A state information table 30 may be provided and regularly updated to indicate the presence of packets of each priority level in each output queue. The queue-length counters 28 also keeps track of the lengths of the different output queues.

The input port counter 24 determines which input port to read and when to read the received packets therefrom. Based on the header of an incoming packet, received from I/O circuitry 16, processor 18 determines the priority and the destination output port of the received packet. Then the processor 18 causes the information in the packet to be stored in a memory location in memory 20, puts a pointer to that location in the corresponding queue in the associative memory, and updates the queue-lengths in queue-length counters 28 and the state information table 30. Processor 18 also periodically accesses the output port that is identified by the present count of the output-port counter, retrieves therefrom a packet that is at the head of the queue, updates the queue-lengths in queue-length counters 28 and the state information table 30, and causes I/O circuitry 16 to transmit the retrieved packet on the corresponding one of the output ports.

Throughout this disclosure, numerical labels are used for the space priority classes. For consistency, the convention used herein assigns higher numbers to classes with higher priority. For example, when there are two classes, Class 2 packets belong to the loss-sensitive class, while Class 1 packets can tolerate higher packet loss rates.

Previous implementations of selective pushout described above require either one or three packet pointers per packet, where packet pointers are herein defined as pointers associated with packets which point from one packet to another. In the exemplary embodiment of the system for queueing and selective pushout and method disclosed herein, only two packet pointers and a field per packet are used. While previous implementations, such as the three pointer implementation, provided redundant information between the FIFO chain traced by the NP and PP pointers and the priority chains traced by the NS pointers, the exemplary implementation of the system for queueing and selective pushout and method disclosed herein reduces the redundancy in information carried by the packet pointers.

OPERATION OF THE DISCLOSED SELECTIVE PUSHOUT IMPLEMENTATION

Figure 3:
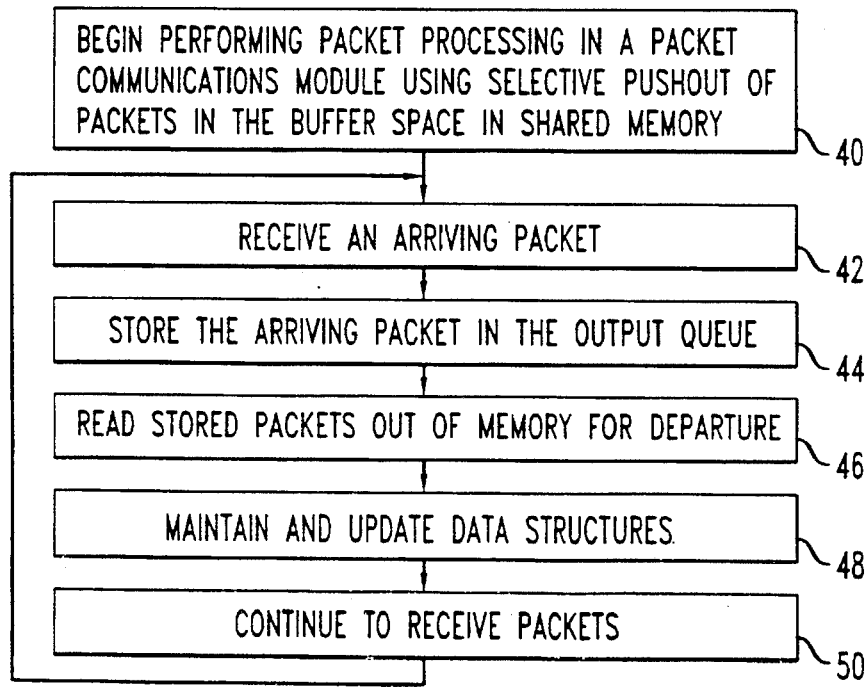
FIG. 3 illustrates a flow diagram of the operation of the disclosed system for queueing and selective pushout and method.

As shown in FIG. 3, the method disclosed herein performs queuing and selective pushout of packets in the shared memory of the packet communications module 10. The method includes the steps of beginning the packet switching in the packet communications module 10 using selective pushout of packets in the buffer space in step 40, receiving an arriving packet in step 42, storing a plurality of packets in at least one output queue including a first and second sub-queue associated with a first and second priority, respectively, in step 44, with each of the queued packets associated with first and second pointers and a field; reading stored packets out of memory for departure in step 46; maintaining and updating the data structures associated with queues and packets in step 48; and continuing to receive packets in step 50.

Figure 4:
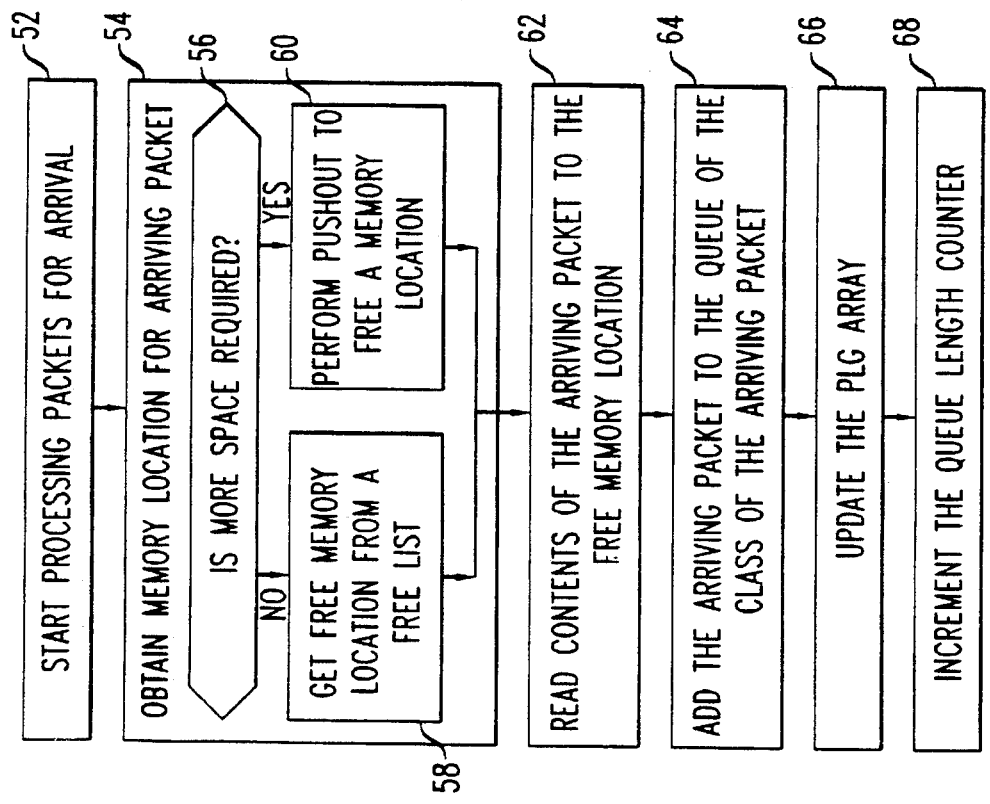
FIG. 4 illustrates a flow diagram illustrating the storage of packets.

As shown in FIG. 4, the step of storing the arriving packet in step 44 includes the steps of starting to process packets for arrival in step 52, obtaining a memory location for the arriving packet in step 54, determining if more space is required in step 56, getting a free memory location from a free list in step 58 if no additional space is required, and otherwise performing pushout to free a memory location in step 60 if additional space is required. After the memory space is obtained after steps 56–60, the method includes the steps of reading the contents of the arriving packet to the free memory location in step 62, adding the arriving packet to the sub-queue corresponding to the priority class of the arriving packet in its destination queue in step 64, updating the PLG array in step 66, and incrementing the queue length counter in step 68.

Figure 5:
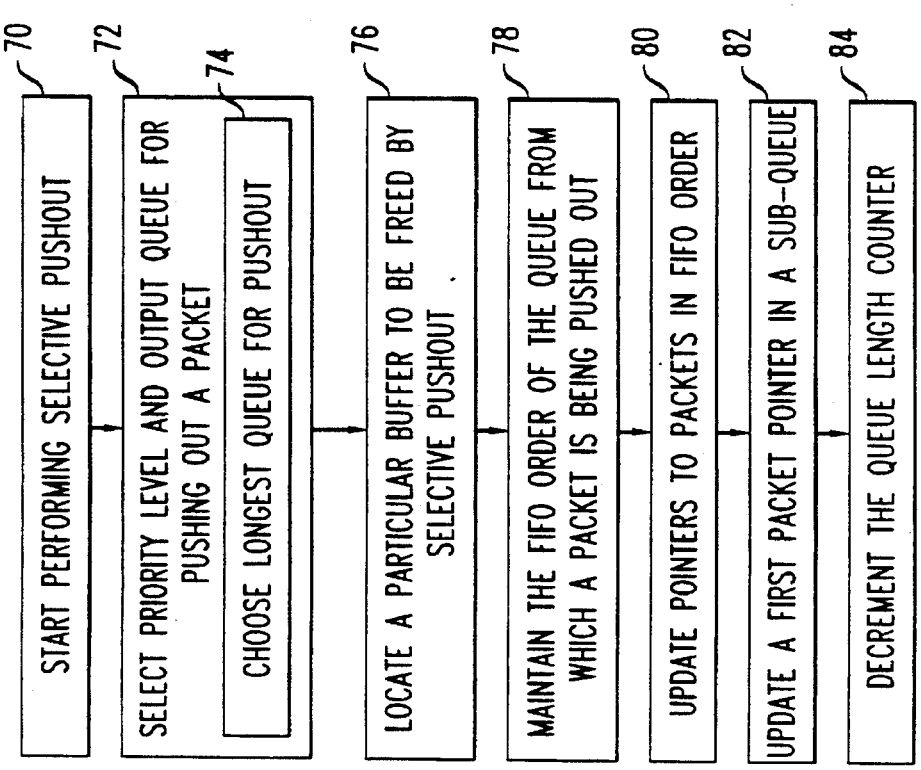
FIG. 5 illustrates a flow diagram illustrating selective pushout of packets.

As shown in FIG. 5, the performance of selective pushout in step 60 includes the steps of starting to perform selective pushout in step 70, and selecting priority level and output queue for pushing out a packet in step 72 which includes choosing a longest queue for pushout of the at least one output queue containing a packet of the lowest priority lower than or equal to that of the incoming packet from a state information table 30 in step 74. Then the performance of selective pushout includes the steps of locating a particular buffer to be freed by selective pushout in step 76, maintaining the FIFO order of the queue from which a packet is being pushed out in step 78, updating the PG pointers of packets which are pointing to the packet being pushed out in step 80, and updating the first packet pointer in a sub-queue in step 82, decrementing the queue length counter in step 84.

Figure 6:
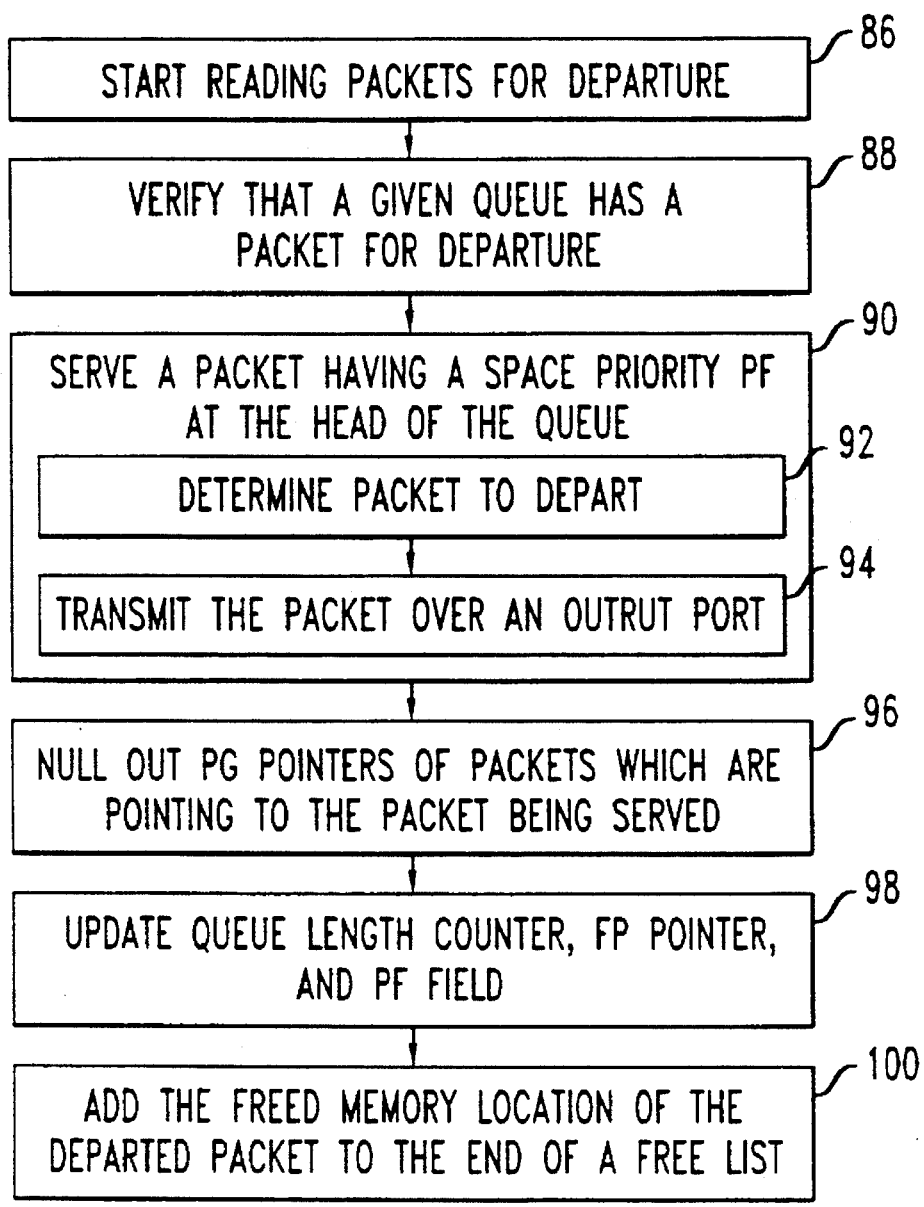
FIG. 6 illustrates a flow diagram illustrating the transmission of packets.

As shown in FIG. 6, the step of reading out stored packets in step 46 in FIG. 3 includes the steps of starting reading stored packets out for departure in step 86, verifying that a given queue has a packet for departure in step 88, and serving a packet at the head of the sub-queue corresponding to space priority PF in step 90 which includes determining a packet to depart in step 92, and transmitting the packet over an output port in step 94. Then the reading out of stored packets for departure includes the steps of nulling out PG pointers of packets which are pointing to the packet being served in step 96, updating queue length counter, FP pointer, and PF field in step 98, and adding the freed memory location of the departed packet to the end of a free list in step 100.

Figure 7:
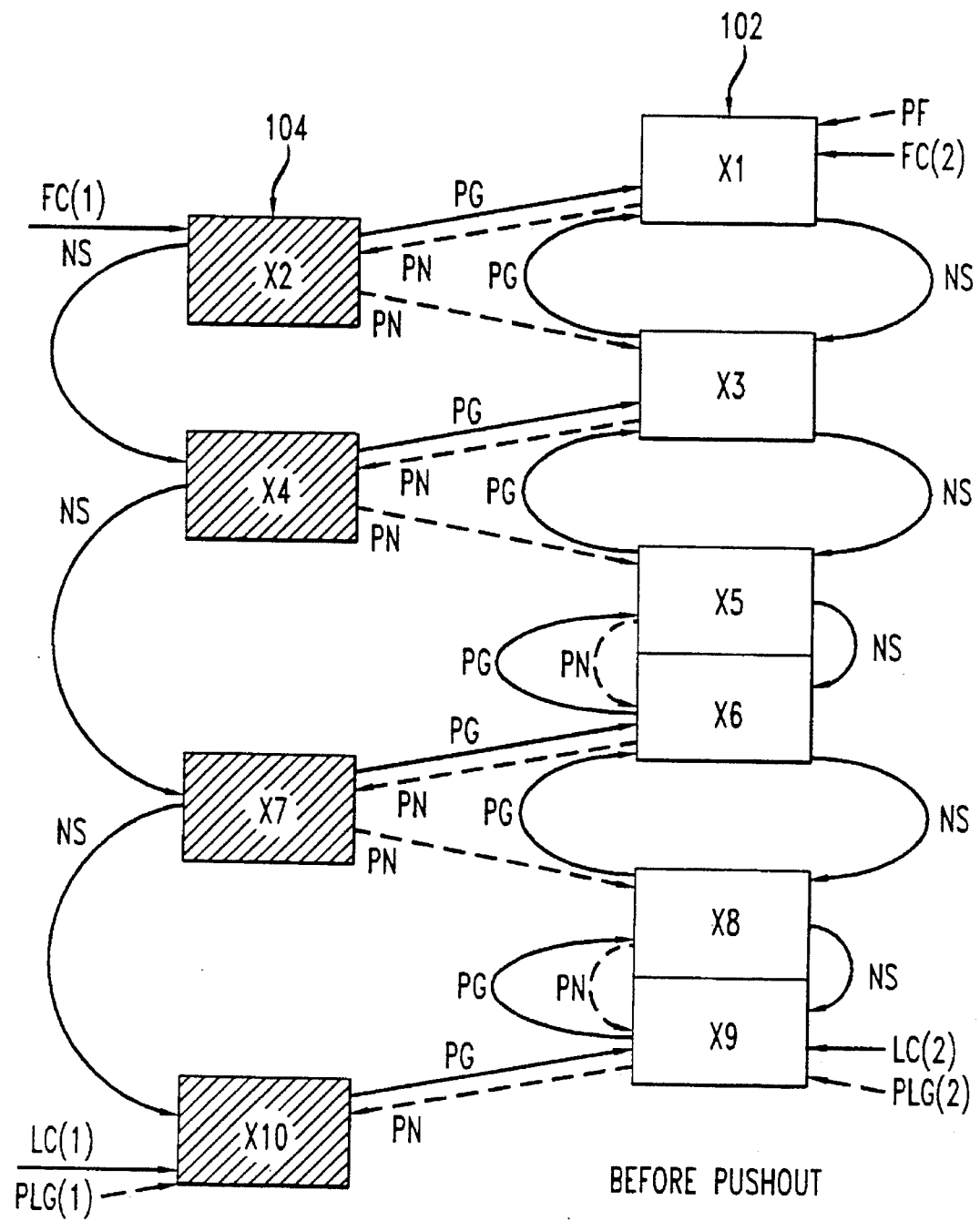
FIGS. 7–8 illustrates an example of the implementation of the selective pushout system and method disclosed herein.
Figure 8:
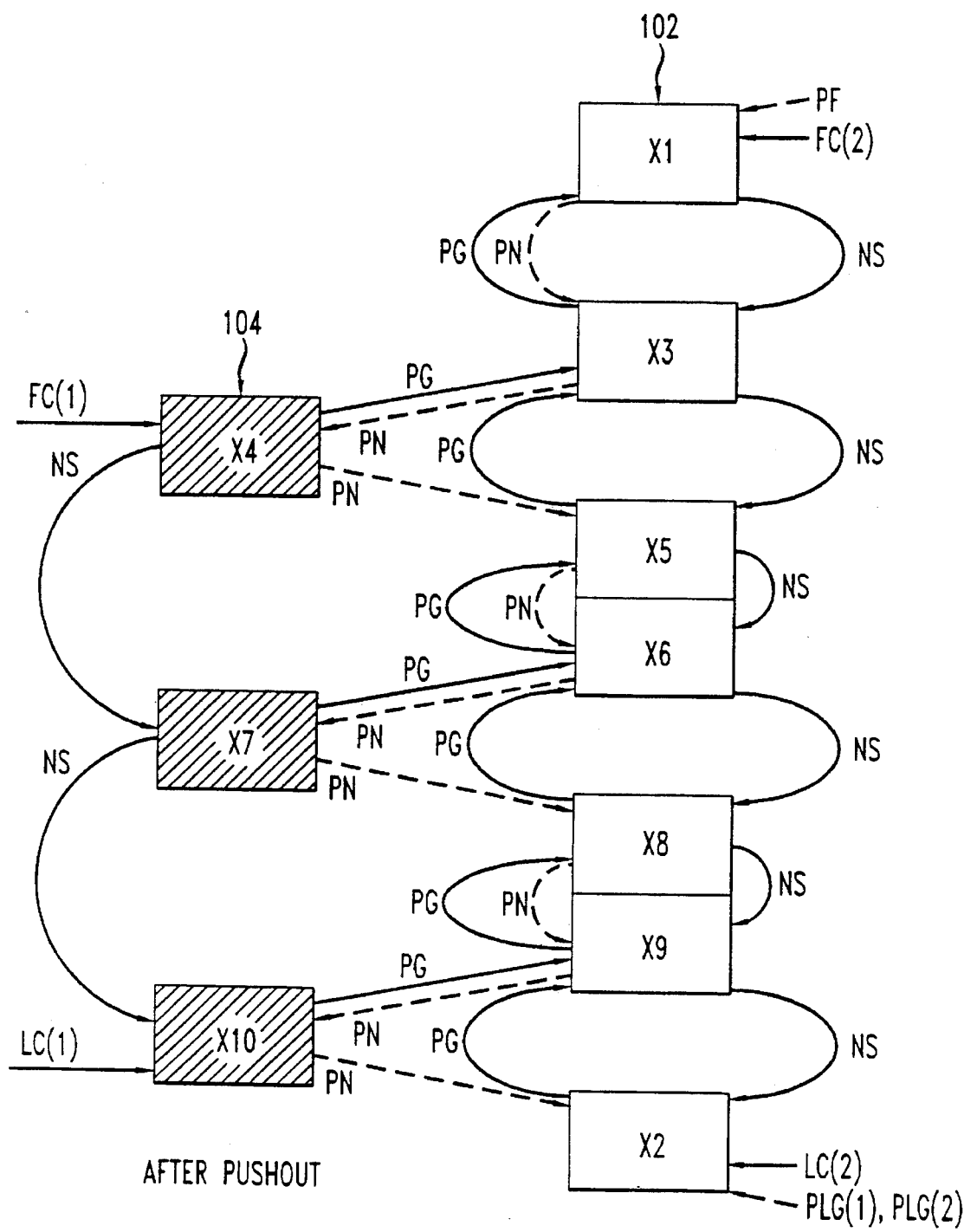

As shown in FIG. 7–8, the primary data structures of the disclosed selective pushout system and method are separate logical queues for each space priority class, as shown in an exemplary embodiment as queue 102 for priority class 1 and queue 104 or priority class 2. Secondary state variables are used to establish the FIFO ordering between the packets. For the example herein disclosed for ATM packets, a singly-linked chain is maintained for each priority class using the NEXT_PACKET_OF_SAME_CLASS (NS) pointer associated with each ATM packet. In contrast to the second implementation described above which uses a NEXT_PACKET pointer, the present selective pushout system and method maintains the overall FIFO ordering using a PRIORITY_OF_NEXT_PACKET_IN_FIFO (PN) field to indicate the priority queue that is to be served next in order to establish the overall FIFO order. In the exemplary embodiment in FIGS. 7–8, pointers are indicated by solid arrows and fields are indicated by dashed arrows. The fields used in the disclosed implementation of the system for queueing and selective pushout and method utilizes less storage than a full pointer does. In order to restore the FIFO order after a pushout, each ATM packet of the present exemplary disclosure uses a PREVIOUS_PACKET_OF_GREATER_OR_EQUAL_PRIORITY (PC) pointer to point to the previous packet of priority greater than or equal to itself in the FIFO order.

The reason for using a PG pointer in the present implementation of the selective pushout system and method is illustrated as follows: if a PP pointer is used to point to the previous packet in FIFO order instead of the PG pointer, and there are three space priority classes, a situation may occur that a sequence of a high priority packet, followed by a low priority packet, followed by a medium priority packet is positioned deep within the FIFO order of some output queue. If the low priority packet is pushed out, establishing the FIFO order in the forward direction is simple. The high priority packet is located using the PP pointer of the low priority packet. The PN field of the high priority packet which had the value "low" is replaced with the PN field of the low priority packet, which has the value "medium". Establishing the FIFO order in the reverse direction is more difficult since one cannot copy the PP pointer of the low priority packet into the PP pointer of the medium priority packet since the medium priority packet cannot be located. Although the packet following the low priority packet in FIFO order is known to be a medium priority packet, it may not necessarily be determined which medium priority packet it is. Thus it is more advantageous to use a PG pointer instead of a PP pointer.

The PG pointer is sufficient, since the reverse FIFO order may be used after a pushout. When a particular packet X is vulnerable to pushout (i.e., packet X is nearest to the head of the queue for its priority class, and has a priority class that is the lowest priority present in the output queue), the PG pointer of packet X is guaranteed to point to the packet preceding it in FIFO order, permitting establishment of the forward FIFO order. When trying to establish the reverse PG pointers, one must realize that by the time a packet X is vulnerable to pushout, the only packet whose PG pointer could still be pointing to packet X is the next packet in the priority class of packet X, which can be located using the NS pointer of packet X.

Also, the PG pointer points to the previous packet of greater than or equal priority, rather than the previous packet of strictly greater priority. The reason for this is to limit the number of PG pointers that must be nulled out when the target packet of those pointers reaches the head of the FIFO order and gets served.

The required data structures for the disclosed selective pushout system and method are given below in categories (A)–(E).

A) For each packet:
 NS=packet pointer to next packet of same priority;
 PG=packet pointer to previous packet of greater or equal priority in FIFO order; and
 PN=field indicating priority of next packet in FIFO order.

B) For each output queue:
 QL=counter indicating length of output queue; and
 PF=field indicating which priority is first in overall FIFO order.

C) For each output queue, for each space priority class i=1, 2, . . . , P:
 FP[i]=pointer to first packet of class i;
 LP[i]=pointer to last packet of class i;
 PLG[i]=field indicating priority of latest packet whose priority is >=i.

D) For the list of free locations in the shared memory:
 FF=pointer to firs packet of a free list; and LF=pointer to last packet of the free list.

FIGS. 7–8 illustrate an example of method of selective pushout disclosed herein using two packet pointers and a field for each packet, with each packet associated one of two space priorities, where the pushing packet and pushed packet belong to the same FIFO queue. It is understood that the disclosed selective pushout system and method may be applied to a packet communications module such as an ATM switch for switching packets having two or more space priorities.

The packet communications module 10 tracks the QUEUE_LENGTH (QL) of each queue, so pushout is performed on appropriate queues. As shown in FIGS. 7–8, gray shaded packets have a class 1 priority and non-gray packets have a class 2 priority which is of greater priority than the class 1 packets. For example, packet X1 is of class 2 and has an NS pointer to the next packet in the queue of the same priority; i.e. packet X3. Each output port maintains an output queue using a first-in-first-out (FIFO) linked-list order. As shown in FIGS. 7–8, to maintain the priority chains, each output queue has two pointers for each priority level i=1, 2, . . . P: FIRST_PACKET_OF_CLASS_i (FP[i]) and LAST_PACKET_OF_ CLASS_i (LP[i]). Each output queue also has a PRIORITY_OF_FIRST_ PACKET (PF) field to indicate which priority is first in overall FIFO order. When a pushout is to be performed, one of the pointers FP[i] indicates the packet to be pushed out. For example, as shown in FIG. 7 prior to the pushout, packet X2 is to be pushed out. As shown in FIG. 8, the new packet of class 2 has been added to the queue and is stored in memory location X2, so the LP[2] pointer is updated to point to X2 and the PN field of packet X10 is updated to indicate that X2 is next in FIFO order. It is understood that after the pushout, X2 has the newly queued packet which may be of a different priority than the pushed-out packet.

In order to set the PG pointer for arriving packets, each output queue needs a field PLG[i], for each priority level i=1, 2, . . . , P, to indicate the priority of the latest packet having a priority greater than or equal to priority i. Note that PLG[1] gives the priority of the last packet in overall FIFO order, analogous to PF. The implementation of the system for queueing and selective pushout and method disclosed herein may operate faster with only a relatively small amount of additional storage if PF and PLG[i] are pre-inflated, i.e. converted into the pointers FP[PF] and LP[PLG [i]] and are stored as such pointers in memory.

The amount of state information used by the disclosed selective pushout system and method is less than the amount used by the second previous implementation of selective pushout, corresponding to the three packet pointer implementation. The disclosed selective pushout system and method is also faster in speed than the first previous implementation of selective pushout corresponding to the one packet pointer implementation.

The following codes in steps (1)–(6) corresponding to the steps 70–84 in FIG. 5 are used to illustrated the pushout of packets in the disclosed selective pushout system and method:

---

1) Select the priority j and the output queue PQ for pushout:
  LET i BE THE PRIORITY OF THE PACKET
  INSTIGATING THE PUSHOUT.
  FOR j = 1 TO i {
    ARE THERE OUTPUT QUEUES WITH
    PACKETS(S) OF PRIORITY j
(FP[j] != NULL)?
    IF SO, CHOOSE LONGEST QUEUE AND BREAK ---continued IF NOT, CONTINUE.
  }
2) Locate the particular buffer location NEWPACKET to be free:
  NEWPACKET = FP [j]

---

The state variables mentioned below are those associated with output queue PQ.

3) Maintain the FIFO order as follows: since NEWPACKET was selected for pushout, there are no packets of priority less than j in output queue PQ, and there are no packets of priority j ahead of NEWPACKET in the FIFO order of output queue PQ. Therefore the packet identified by the PG pointer of NEWPACKET is immediately ahead of NEW-PACKET in FIFO order and adopts the PN value of NEW-PACKET as its own:

IF (NEWPACKET->PG!=NULL) NEWPACKET->PG->PN=
 NEWPACKET->PN IF (PF==j)PF=NEWPACKET->PN

4) If the NEXT_PACKET_OF_CLASS_j had its PG pointer pointing to the pushed-out location NEWPACKET, then this PG pointer is updated to match the PG pointer of NEWPACKET. This is the only packet having its PG pointer pointing to NEWPACKET, because the priority sub-queues of PQ with priority less than j are empty.

IF ((NEWPACKET->NS!=NULL) AND (NEWPACKET->NS-
 >PG==NEWPACKET)) NEWPACKET->NS->PG=NEW-
 PACKET->PG

5) Since the pushed-out packet is located at the head of one of the logical sub-queues, the order in the logical sub-queue is maintained by updating the first packet pointer to the new head of the sub-queue:

---

FP[j] = NEWPACKET -> NS
IF (FP[j] = = NULL) {
  LP[j] = NULL
  IF (j < P) SET PLG[1], PLG[2], . . . ,
  PLG[j] TO PLG[j + 1]
  ELSE SET PLG[1], PLG[2], . . . , PLG[P] TO 0
}

---

6) The queue length counter is then decremented:

$QL=QL-1$.

The system for queueing and selective pushout and method disclosed herein uses the associated memory 22 to store state information relating to the packets and the output queues. Generally, for ATM switches, the overwhelming majority of this use of memory is required by the packet pointers belonging to the individual packets. The memory space required for fields of packets is negligible, and the queue pointers and counters dedicated to individual output queues consume a relatively small amount of memory. However, the packet pointers can consume a relatively large amount of memory if the number of packets in the memory is large.

The present implementation of the system for queueing and selective pushout and method using only two packet pointers and one field per packet reduces the number of memory-consuming pointers. For an ATM switch capable of queueing a great number of packets, the memory savings of the present selective pushout system and method may be substantial.

The following exemplary codes are used to illustrate the departure and arrival of packets in the disclosed system for queueing and selective pushout and method.

DEPARTURE OF PACKETS

The departure of packets is illustrated in code in steps (1)–(4) below corresponding to step 86–100 in FIG. 6.
1) Verify that the queue has a packet to serve:

```
IF (FP==NULL) THEN EXIT.
```

2) Serve packet X of space priority PF at the head of the queue:

```
X=FP [PF];

TRANSMIT PACKET AT MEMORY LOCATION X
OVER A GIVEN OUTPUT PORT.
```

3) All the packets whose PG pointers point to the packet being served have these PG pointers nulled out. If there are any such packets, they can only be located at the heads of the queues with priority less than PF or just after the packet being served in the logical queue for class PF.

```
FOR j = 1 TO PF-1 {
    IF ((FP[j] != NULL) AND (FP[j] -> PG = = X))
        FP[j] -> PG = NULL
}
IF ((X -> NS != NULL) AND (X -> NS -> PG = = X))
    X -> NS -> PG = NULL;
```

5) The queue length counter, the FP[PF] pointer, and the PF field are updated:

```
QL = QL - 1
FP [PF] = X -> NS
IF (FP[PF] = = NULL {
    LP [PF] = NULL
    FOR (INITIALIZE j = PF; WHILE ((j > 0) AND
    (PLG[j] = = PF));
                                        DECR j)
                                        PLG[j] = 0
}
PF = X -> PN.
```

4) Then add the freed memory location to tail of free list:

```
IF (FF = = NULL) FF = X
ELSE        LF -> NP = X
LF = X.
```

ARRIVAL OF PACKETS

The arrival of packets is illustrated in code in steps (1)–(4) below corresponding to the steps of FIG. 4.
1) Store new packet of priority i in memory location NEWPACKET, either fetched from the free list or determined by pushout:

```
IF (FF = = NULL)
    DO A PUSHOUT TO GET LOCATION OF
    NEWPACKET
ELSE {
    NEWPACKET = FF
    FF = FF -> NC
```

```
IF (FF = = NULL) LF = NULL
}
READ THE CONTENTS OF THE ARRIVING PACKET
INTO MEMORY
LOCATION NEWPACKET
```

2) Add a newly arrived packet of Class i:

```
IF (PLG[i] = = 0)       NEWPACKET -> PG = NULL
ELSE                    NEWPACKET -> PG = LP[PLG[i]]
IF (PLG[1] = = 0)       PF = i
ELSE                    LP[PLG[1]]-> PN = i
IF (FP[i] = = NULL)     FP[i] = NEWPACKET
ELSE                    LP[i ]-> NS = NEWPACKET
LP[i] NEWPACKET;
```

3) The PLG array is updated:

$$PLG[j]=i$$

FOR $$j=1,2,\ldots,i$$

4) The queue length counter is then incremented:

$$QL=QL+1.$$

FINDING THE LONGEST QUEUE FOR SELECTIVE PUSHOUT

By maintaining a state information table 30, the search for the longest appropriate queue described above for step 74 in FIG. 5 can be performed more quickly without greatly increasing the size of the associated memory 22.

FIG. 9 illustrates an exemplary state information table 30, used by the system for queueing and selective pushout and method and stored in the associated memory 22, which contains identifying information for the queues and information about the presence of packets of each priority level in the queues. In an alternative embodiment, the system for queueing and selective pushout and method disclosed herein may equivalently use a hierarchical list, a set of arrays, a matrix, or equivalent data structures to store the state information table 30.

Referring to FIG. 9, each row except the bottom one corresponds to one output port of the shared memory. The rows are sorted by output port queue length, with the longest queue at the top. Column 0 of row q gives the identification (ID) number of the $q^{th}$-longest output queue. For j=1, ..., P, column j of row q contains one bit indicating whether there are any packets of priority j currently present in the $q^{th}$-longest output queue. The entries along each column j=1, ..., P are logically OR'd together to produce the entry in the bottom row; this entry indicates whether there are any packets of priority j currently present anywhere in the shared memory.

When a packet of priority i is to be stored by a pushout of another packet, the bottom row of the state information table 30 is read from left to right to find the lowest priority $j<=i$ for which packets are present somewhere in the shared memory. Then column j is read from top to bottom to find the longest queue with packet(s) of priority j. This queue is thus determined from column 0 to be the queue from which a packet should be pushed.

In performing selective pushout, the ordering of the rows by queue length is not required to be absolutely up-to-date. A background process may be used to manage the time-consuming tasks of re-ordering the queues; this process may regularly rearrange the rows of the state information table 30 as necessary.

The contents of each row of the state information table 30 are regularly updated to be current, so that pushouts are not attempted from queues that no longer have any packets of the desired priority. Therefore, in the exemplary embodiment, the relevant bit in the state information table 30 is updated after each packet arrival, service, and pushout. For performing the updating of the state information table 30, each output queue is associated with a field indicating its current ranking in the queue length ordering, i.e. its row in the state information table 30. The use of such a field allows the output queue to maintain its row of bits in the state information table 30 as packets join the queue, are served by the queue, or are pushed out from the queue.

While the disclosed implementation of the system for queueing and selective pushout and method has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A system for queuing and performing selective pushout of packets comprising:

a packet processing circuit, including a shared memory and a processor, for processing packets as incoming and outgoing packets, for receiving an incoming packet on an input port and for transmitting an outgoing packet on an output port, with the packets belonging to one space priority class corresponding to an associated space priority level;

wherein the shared memory stores the processed packets in at least one queue having a plurality of priority sub-queues wherein, within the at least one queue, the shared memory stores the packets in the plurality of priority sub-queues corresponding to the space priority levels of the packets;

wherein each packet is associated with a first and a second pointer and a field, the first pointer for pointing to the next packet of the same space priority level in the at least one queue, the second pointer for pointing to a previous packet of a greater or equal space priority level in the FIFO order in the at least one queue, and the field for storing the space priority level of the next packet in the FIFO order in the at least one queue; and wherein the processor controls the storing of received packets in the at least one queue of the shared memory for transmitting packets from the at least one queue and for pushing packets out of the at least one queue, and the received packets are stored in the plurality of priority sub-queues within the at least one queue using the first pointers associated with the packets, and a FIFO order is maintained among all the packets in the queue using the fields and the second pointers of the packets by restoring, after a pushout of a first packet, the FIFO order using the first and second pointers and the fields associated with the packets.

2. The system of claim 1 wherein the packet processing circuit processes packets of variable lengths.

3. The system of claim 1 wherein the packet processing circuit processes packets of fixed lengths.

4. The system of claim 1 wherein the packets are asynchronous transfer mode (ATM) cells.

5. The system of claim 1 wherein the packet processing circuit is connected to a plurality of input ports; and the processor controls the packet processing circuit to perform packet multiplexing functions.

6. The system of claim 1 wherein the packet processing circuit is connected to a plurality of output ports; and the processor controls the packet processing circuit to perform packet demultiplexing functions.

7. The system of claim 1 wherein the packet processing circuit is connected to a plurality of input ports and a plurality of output ports; and the processor controls the packet processing circuit to perform switching functions.

8. The system of claim 1 wherein a first queue of the at least one queue which receives the incoming packet includes packets destined for the same output port as the incoming packet and belonging to at least one space priority class.

9. The system of claim 1 wherein a first queue of the at least one queue which receives the incoming packet includes packets received via the same input port as the incoming packet and belonging to one space priority class.

10. The system of claim 1 wherein the processor determines a longest queue from the at least one queue and performs selective pushout on the longest queue.

11. The system of claim 1 wherein the shared memory stores the queue-length of the at least one queue and a state information table including identifying information for the at least one queue and the space priority levels of packets contained therein; and the processor uses the queue-length of the at least one queue and state information table to determine the longest queue containing a packet of the lowest space priority level lower than or equal to that of the incoming packet.

12. A method for queuing and performing selective pushout of packets in the shared memory of a packet communications module, the method comprising the steps of:

storing packets in at least one queue having a plurality of priority sub-queues in the shared memory wherein, within the at least one queue, wherein the shared memory stores the packets in the plurality of priority sub-queues corresponding to the space priority levels of the packets, where the at least one queue and the plurality of sub-queues include data structures associated with them and the packets are associated with a first pointer for pointing to the next packet of the same space priority level in the at least one queue, a second pointer for pointing to a previous packet of a greater or equal space priority level in a FIFO order in the at least one queue, and a field for storing the space priority level of the next packet in the FIFO order in the at least one queue;

transmitting packets from the at least one queue;

pushing out packets from the at least one queue; and maintaining queue-lengths and a state information table.

13. The method of claim 12 wherein the data structures associated with the at least one queue are a queue-length counter and a field indicating which space priority level is first in the FIFO order; and the data structures associated with each of the plurality of priority sub-queues are a first and a second pointer pointing to the first and last packets respectively in the associated sub-queue, and a field indicating the space priority level of the previous packet in the FIFO order whose space priority level is greater than or equal to that of the sub-queue under consideration.

14. The method of claim 12 wherein the step of storing packets in at the least one queue includes the steps of:

receiving an incoming packet having an associated space priority level;

using selective pushout to create space if needed;

storing the packet in the priority sub-queue corresponding to the space priority level of the incoming packet using the first pointer;

storing in the field associated with the packet the space priority level corresponding to the next packet in FIFO order;

maintaining the FIFO order among the packets queued in the queue using the field and the second pointer; and incrementing the queue-length counter and updating the other data structures associated with the at least one queue and the plurality of priority sub-queues contained therein.

15. The method of claim 12 wherein the step of transmitting includes the steps of:

reading out the first packet in the FIFO order of the at least one queue;

updating the second pointer pointing to the packet being transmitted; and decrementing the queue-length counter and updating the other data structures associated with the at least one queue and the plurality of priority sub-queues contained therein.

16. The method of claim 12 wherein the step of pushing out a packet includes the steps of:

determining a longest queue of the at least one queue containing a packet of the lowest space priority level lower than or equal to that of the incoming packet;

pushing out the first packet from the corresponding priority sub-queue within the longest queue;

decrementing the queue-length counter and updating the other data structures associated with the at least one queue and the plurality of priority sub-queues contained therein; and restoring the FIFO order of the at least one queue using the first and second pointers and the fields of the queued packets.

17. The method of claim 12 including the step of maintaining the queue-length of the at least one queue and a state information table including identifying information for the at least one queue and the space priority levels of the packets contained therein; and the step of determining a longest queue containing a packet of the lowest space priority level lower than or equal to that of the incoming packet using the state information table.

18. A packet processing circuit for performing selective pushout of packets comprising:

input/output (I/O) circuitry for processing packets as incoming and outgoing packets which belong to a space priority class corresponding to an associated space priority level, for receiving incoming packets at an input port and for transmitting outgoing packets on an output port;

a shared memory for storing the processed packets with each packet associated with a first and a second pointer and a field, the first pointer for pointing to a next packet of the same space priority level in a predetermined order, the second pointer for pointing to a previous packet of a greater or equal space priority level in the predetermined order, and the field for storing the space priority level of the next packet in the predetermined order; and a processor for controlling the pushout of a first packet and for controlling the storing of processed packets in the shared memory to maintain the predetermined order among all the packets using the fields and the second pointers of the packets by restoring, after the pushout of the first packet, the FIFO order using the first and second pointers and the fields associated with the packets.

19. The packet processing circuit of claim 18 wherein the processor processes packets of variable lengths.

20. The packet processing circuit of claim 18 wherein the packets are asynchronous transfer mode (ATM) cells.

* * * * *